P. B. BOSWORTH.
FASTENING DEVICE FOR VEHICLE TIRES.
APPLICATION FILED APR. 18, 1907.
977,588.
Patented Dec. 6, 1910.
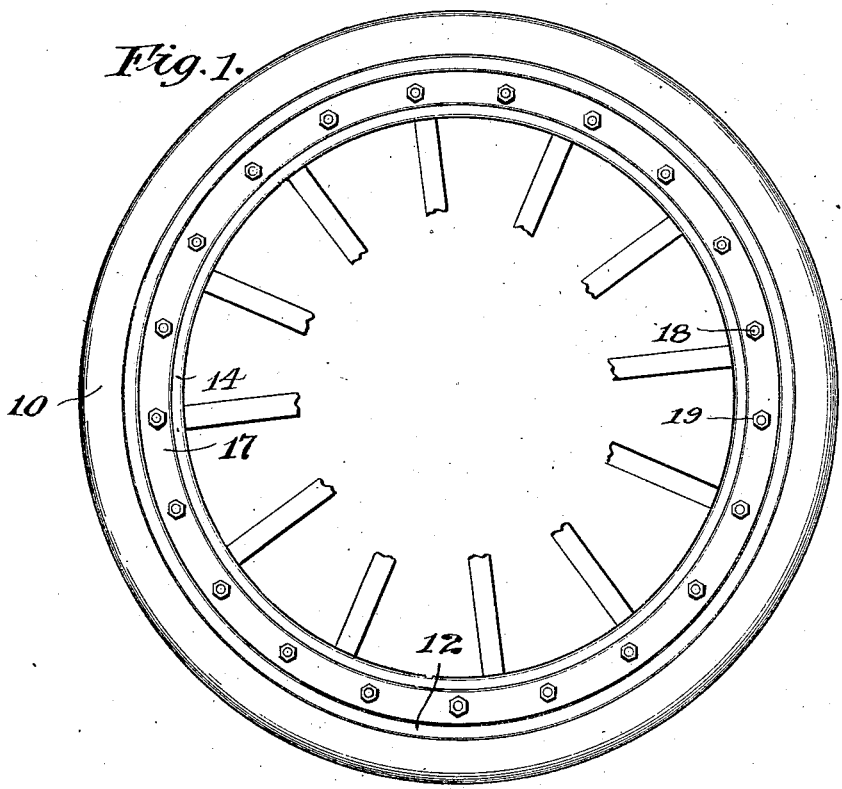
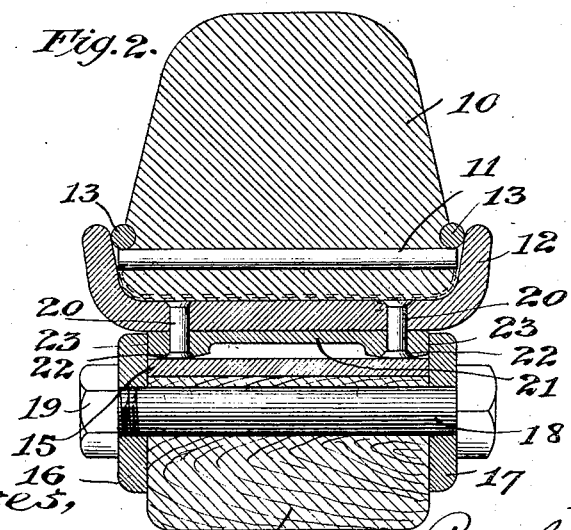

UNITED STATES PATENT OFFICE.

PERCY B. BOSWORTH, OF AKRON, OHIO, ASSIGNOR TO FIRESTONE TIRE & RUBBER COMPANY, OF AKRON, OHIO, A CORPORATION OF WEST VIRGINIA.

FASTENING DEVICE FOR VEHICLE-TIRES.

977,588.          Specification of Letters Patent.      Patented Dec. 6, 1910.

Application filed April 18, 1907. Serial No. 368,971.

*To all whom it may concern:*

Be it known that I, PERCY B. BOSWORTH, a citizen of the United States, residing at Akron, in the county of Summit and State of Ohio, have invented certain new and useful Improvements in Fastening Devices for Vehicle-Tires, of which the following is a specification.

This invention relates to the art of vehicle tires, and pertains more especially to new and improved means for securing the tires on the rims of wheels. In the case of automobile and truck tires, especially, which are subject to comparatively frequent repair and renewal, it is desirable to render such tires easy of application and removal to and from the wheel, and consequently the matter of fastening or retaining devices for such tires has latterly assumed considerable importance.

The object of my invention is to provide a new and simplified means for securely fastening a tire on the wheel while at the same time permitting its easy and ready withdrawal for repair or substitution by a new tire; and to this end my invention comprehends as its principal novel feature the provision of a removable tire-seating rim adapted to be applied sidewise over the permanent rim or felly of the wheel in combination with coöperating devices carried by said removable rim and permanent rim or felly, respectively, for detachably securing the former on the latter.

I have illustrated the principle of my invention in several forms in which the same may find expression in the accompanying drawings, wherein,—

Figure 1 is a side elevational view of the rim and tire-portion of a wheel equipped with my improvements. Fig. 2 is an enlarged cross-sectional view through the tire and felly of the wheel.

In the accompanying drawings I have selected to illustrate my present improvements a form and construction of tire and tire-clamping means disclosed in Letters Patent to James A. Swinehart, No. 624,992, granted May 16, 1899; but it will be understood that the principle of my invention is equally applicable to other forms of tire, whether solid or pneumatic.

Referring to Figs. 1 and 2, 10 may designate the tire proper, 11 the transverse pins embedded in the base of the tire, 12 a standard channel-shaped rim, and 13 the retaining side wires, all substantially as illustrated in the Letters Patent hereinabove referred to. In the said patent, however, the rim corresponding to the rim 12 is shrunk on the felly of the wheel and constitutes a permanent part thereof. In my present invention, the channel rim 12 is designed to be readily removable relatively to the wheel rim, but constitutes a fixed member of the tire, being in the nature of a supplemental rim.

14 indicates the wooden felly of the wheel, which is surrounded by a plain metal band or rim 15 shrunk thereon. 16 and 17 designate, respectively, a pair of side-flange members that are secured to the felly by through-bolts 18 and nuts 19; these side-flanges being simply plain rings apertured for the passage of the through-bolts 18 and at their outer margins projecting somewhat beyond the rim 15, with their inner walls vertical or at right angles to the latter, whereby to constitute retaining devices as hereinafter described. Secured to the inner periphery of the supplemental rim 12 as by rivets 20 is a ring or band 21 that may be hollowed out on its inner side so as to present simply two lines of contact at 22 with the rim 15, which lessens friction and reduces the work required in sliding the tire on and off the rim 15. This ring or band 21 constitutes the coöperating member of the retaining means, for which purpose its opposite edges are made vertical to abut squarely against the projecting inner walls of the retaining flanges 16 and 17, as shown at 23 in Fig. 2.

To remove the tire constructed as shown and described it is necessary only to remove the nuts 19 and withdraw the adjacent flange 17, whereupon the tire with its attached channel-rim and base-member, may be withdrawn laterally of the rim or felly; and the simple reverse of these operations effects the application of the tire to the rim or felly.

As above stated, the principle of the invention is applicable to vehicle tires in general, irrespective of their particular construction, or the particular means for securing them in their retaining channel; but where employed in connection with a channel and side retaining wires such as herein shown, a large saving in time and labor is effected by reason of the fact that no machine is required to spring the side wires 13 into place when a new tire is to be applied to the wheel, and of course this same advantage holds true in the case of tires having internal or other machine-operated retaining devices.

I am aware that it is old broadly to employ a supplemental rim that is detachable with the tire relatively to the permanent rim or felly of the wheel, and also to employ in connection therewith retaining means in the nature of a side-flange directly engaging a supplemental rim of special construction. It will be observed that in my invention as shown and described the retaining side-flanges do not directly engage the supplemental or tire-carrying rim, nor do they require any special construction of such supplemental or tire-carrying rim; but rather they engage a coöperating fastening member that is secured to the inner periphery of the supplemental or tire-carrying rim and is suitably shaped to coöperate with the retaining flanges. My invention is thus adapted for use with any standard forms of tire-carrying rim, and does not require modification or special formation of the latter.

I claim:

In a device of the character described, the combination of a tire-seating rim, and a wheel-rim having a cylindrical external surface, of a ring secured to the inner periphery of said tire-seating rim, said ring being hollow on the central part of its inner side and having a pair of inwardly-directed transversely-convex ribs with line contacts on said wheel rim, said ring having outer edges substantially flush with the side faces of said wheel-rim, side flanges projecting radially beyond the sides of said wheel-rim and engaging said opposite edges of said ring, and through-bolts detachably securing at least one of said side flanges to said wheel-rim, substantially as described.

PERCY B. BOSWORTH.

Witnesses:
SAMUEL N. POND,
FREDERICK C. GOODWIN.